(12) United States Patent
Lee et al.

(10) Patent No.: US 11,951,928 B2
(45) Date of Patent: Apr. 9, 2024

(54) ROOF AIRBAG FOR VEHICLE

(71) Applicant: HYUNDAI MOBIS CO., LTD., Seoul (KR)

(72) Inventors: Dong Oh Lee, Yongin-si (KR); Byung Ho Min, Yongin-si (KR); Do Hyoung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/396,632

(22) Filed: Aug. 6, 2021

(65) Prior Publication Data

US 2022/0063544 A1 Mar. 3, 2022

(30) Foreign Application Priority Data

Aug. 25, 2020 (KR) .................. 10-2020-0107340

(51) Int. Cl.
| | |
|---|---|
| *B60R 21/214* | (2011.01) |
| *B60R 21/231* | (2011.01) |
| *B60R 21/2334* | (2011.01) |
| *B60R 21/00* | (2006.01) |

(52) U.S. Cl.
CPC .......... *B60R 21/214* (2013.01); *B60R 21/231* (2013.01); *B60R 21/2334* (2013.01); *B60R 2021/0018* (2013.01); *B60R 2021/23192* (2013.01)

(58) Field of Classification Search
CPC ... B60R 21/214; B60R 21/231; B60R 21/213; B60R 21/2334; B60R 21/233; B60R 2021/23192; B60R 2021/23576; B60R 2021/2358; B60R 2021/23585; B60R 2021/2359; B60R 2021/23595; B60R 2021/23316; B60R 2021/23308; B60R 2021/0018
USPC ........................ 280/728.2, 730.1, 729, 743.1
See application file for complete search history.

(56) References Cited

U.S. PATENT DOCUMENTS

| | | | |
|---|---|---|---|
| 6,189,960 B1 * | 2/2001 | Mumura ................ | B60R 21/214 180/281 |
| 2004/0066022 A1 * | 4/2004 | Mori ................... | B60N 2/42745 280/730.1 |
| 2004/0239083 A1 * | 12/2004 | Mori ...................... | B60R 21/26 280/730.1 |
| 2011/0163521 A1 * | 7/2011 | Gammill ............. | B60R 21/2171 248/220.21 |

(Continued)

FOREIGN PATENT DOCUMENTS

KR 10-2018-0105997 10/2018

*Primary Examiner* — Keith J Frisby
(74) *Attorney, Agent, or Firm* — DLA Piper LLP (US)

(57) ABSTRACT

A roof airbag for a vehicle includes: an airbag cushion located at a roof panel of the vehicle and configured to be unfolded from a first side portion to a second side portion of the roof panel during an operation of the airbag cushion; a first seam portion extended in a direction intersected with an unfolded direction of the airbag cushion and allowing upper and lower surfaces of the airbag cushion to be in contact with each other; and an inflator coupled to the first side portion of the roof panel, and connected to the airbag cushion and configured to inject gas into the airbag cushion so as to allow the airbag cushion to be unfolded from the first side portion to the second side portion of the roof panel.

9 Claims, 4 Drawing Sheets

(56) References Cited

U.S. PATENT DOCUMENTS

| | | | |
|---|---|---|---|
| 2013/0069348 A1* | 3/2013 | Choi | B60R 21/214 |
| | | | 280/730.2 |
| 2018/0312130 A1* | 11/2018 | Min | B60R 21/13 |
| 2019/0016292 A1* | 1/2019 | Son | B60R 21/262 |
| 2019/0111885 A1* | 4/2019 | Hwangbo | B60R 21/2338 |
| 2021/0138987 A1* | 5/2021 | Lee | B60R 21/2334 |
| 2021/0179004 A1* | 6/2021 | Lee | B60R 21/214 |

* cited by examiner

PRIOR ART

ROOF AIRBAG FOR VEHICLE

CROSS REFERENCE TO RELATED APPLICATION

The present application claims priority to Korean Patent Application No. 10-2020-0107340, filed Aug. 25, 2020, the entire contents of which is incorporated herein for all purposes by this reference.

BACKGROUND OF THE INVENTION

Field of the Invention

The present invention relates to a roof airbag for a vehicle and, more particularly, to a vehicle roof airbag capable of preventing a passenger from bodily injury or from being ejected from the vehicle when a vehicle accident occurs.

Description of the Related Art

In general, a vehicle includes an airbag device for safety of a passenger. A general airbag device includes an inflator and an airbag cushion. When the vehicle receives an external impact over a predetermined degree, the inflator supplies gas into the airbag cushion to unfold the airbag cushion, so that the passenger is protected.

The airbag device may be mounted to a predetermined portion of the vehicle, e.g., a steering wheel mounted to an instrument panel, an upper end of a glove box, and a side portion inside the vehicle, etc., depending on specification of the vehicle, an object to be protected, etc.

Specifically, a roof airbag is a kind of airbag device that is mounted to a roof of the vehicle and is unfolded above the passenger to protect the passenger. The roof airbag shields an opening of a sunroof provided on the vehicle while being unfolded during an emergency event. Therefore, the passenger can be prevented from being ejected through the opening of the sunroof and the roof airbag reduces an impact acting on the passenger and injuries to the passenger may be reduced.

However, when the roof airbag is unfolded, a non-protecting area is generated due to contraction of the airbag cushion depending on the shape of the airbag cushion, and protection by the airbag cushion does not reach to the non-protecting area.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a roof airbag for a vehicle, the roof airbag being capable of reducing a non-protecting area in which protection of an airbag does not reach due to contraction of a conventional airbag cushion, wherein an airbag cushion is unfolded from a roof of the vehicle, a first seam portion and a second seam portion, which allow upper and lower portions of the airbag cushion to be in contact with each other to guide a flow direction of gas in the airbag cushion, are formed in a direction intersected with an unfolded direction of the airbag cushion so as to be contracted in the direction intersected with the unfolded direction of the airbag cushion.

The roof airbag for a vehicle according to the present invention includes: an airbag cushion located at a roof panel of the vehicle and configured to be unfolded from a first side portion to a second side portion of the roof panel during an operation of the airbag cushion; a first seam portion extended in a direction intersected with an unfolded direction of the airbag cushion and joining upper and lower surfaces of the airbag cushion to each other; and an inflator coupled to the first side portion of the roof panel, and connected to the airbag cushion, and configured to inject gas into the airbag cushion so as to allow the airbag cushion to be unfolded from the first side portion to the second side portion of the roof panel.

The airbag cushion may be configured to contract in a direction parallel to the unfolded direction of the airbag cushion during an unfolding thereof.

The first seam portion may be formed by being spaced apart from a lateral end of the unfolded airbag cushion toward a central portion of the airbag cushion.

The roof airbag may include: a second seam portion separated from the first seam portion in the unfolded direction of the airbag cushion, and allowing the upper and lower surfaces of the airbag cushion to be in contact with each other, and being extended in the direction intersected with the unfolded direction of the airbag cushion with a length relatively shorter than a length of the first seam portion.

The second seam portion may include a plurality of second seam portions arranged to be spaced apart from each other in an extended longitudinal direction thereof.

The second seam portion may be formed by being spaced apart from the lateral end of the unfolded airbag cushion toward a central portion of the airbag cushion.

The inflator may be coupled to the roof panel by being connected to both a first bracket and a clamp.

The roof airbag may include: a second bracket coupled to the first side portion of the roof panel of the vehicle and coupled to the airbag cushion.

The roof airbag may include: a guide device coupled to the roof panel of the vehicle, and connected to the lateral end of the unfolded airbag cushion, and extended in the unfolded direction of the airbag cushion to guide the unfolding of the airbag cushion from the first side portion to the second side portion of the roof panel.

The guide device may include: a wire mounted to the roof panel of the vehicle and extended in the unfolded direction of the airbag cushion; and a connecting portion connecting the airbag cushion to the wire.

According to the present invention, the roof airbag for a vehicle includes the first seam portion allowing the upper and lower surfaces of the airbag cushion to be in contact with each other. The first seam portion is extended in the direction intersected with the extended direction of the airbag cushion to be contracted in the direction parallel to the unfolded direction of the airbag cushion. Accordingly, the non-protecting area formed on opposite ends of the airbag cushion can be protected.

The roof airbag for a vehicle includes the second seam portion extended relatively shorter than the first seam portion. The plurality of second seam portions is extended to be spaced apart from each other in an extended direction thereof. Accordingly, gas is supplied through a gap between the second seam portions into the airbag cushion and the airbag cushion can be unfolded quickly.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
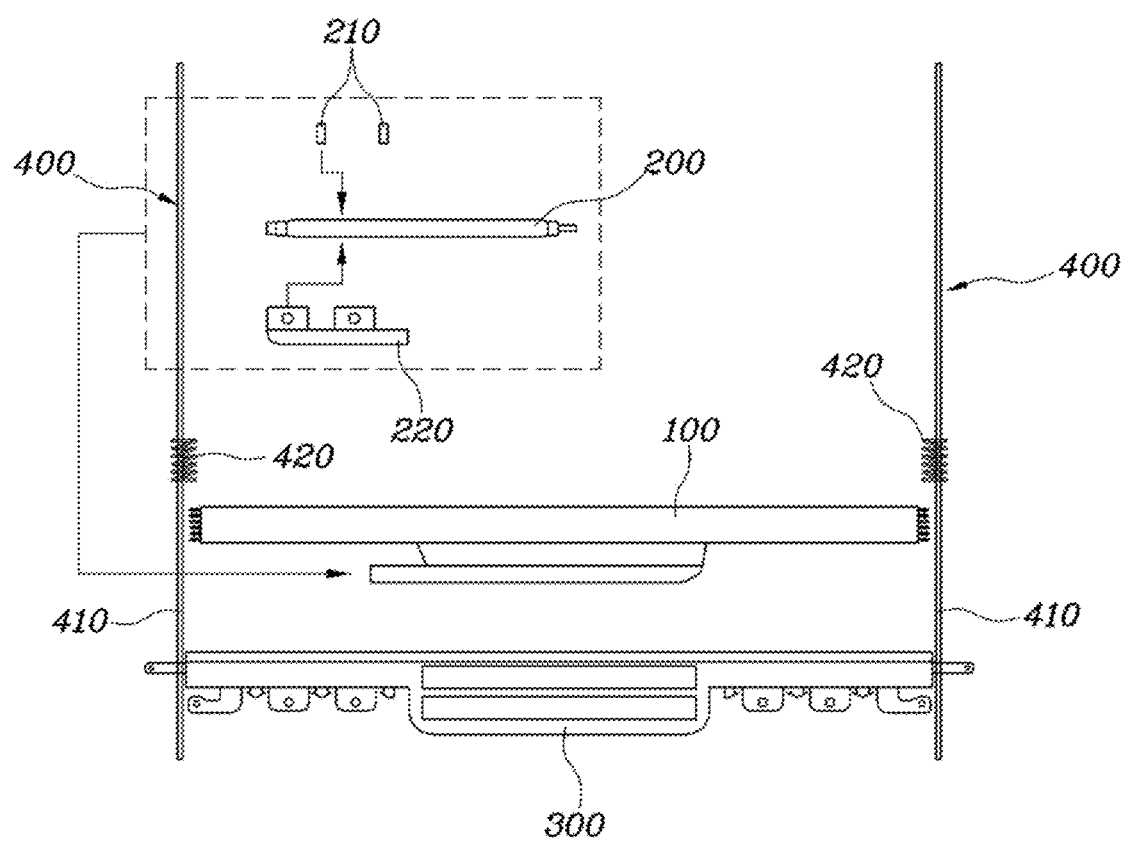
FIG. 1 is an exploded front view showing a roof airbag for a vehicle according to an embodiment of the present invention.

In the following description, the structural or functional description specified to an exemplary embodiment according to the concept of the present invention is intended to describe the exemplary embodiments, so it should be understood that the present invention may be variously embodied, without being limited to the exemplary embodiment.

An embodiment described herein may be changed in various ways and various shapes, so a specific embodiment is shown in the drawings and will be described in detail in this specification. However, it should be understood that the exemplary embodiment according to the concept of the present invention is not limited to the embodiment which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, an exemplary embodiment will be described hereafter in detail with reference to the accompanying drawings. Like reference numerals given in the drawings indicate like components.

Figure 2:
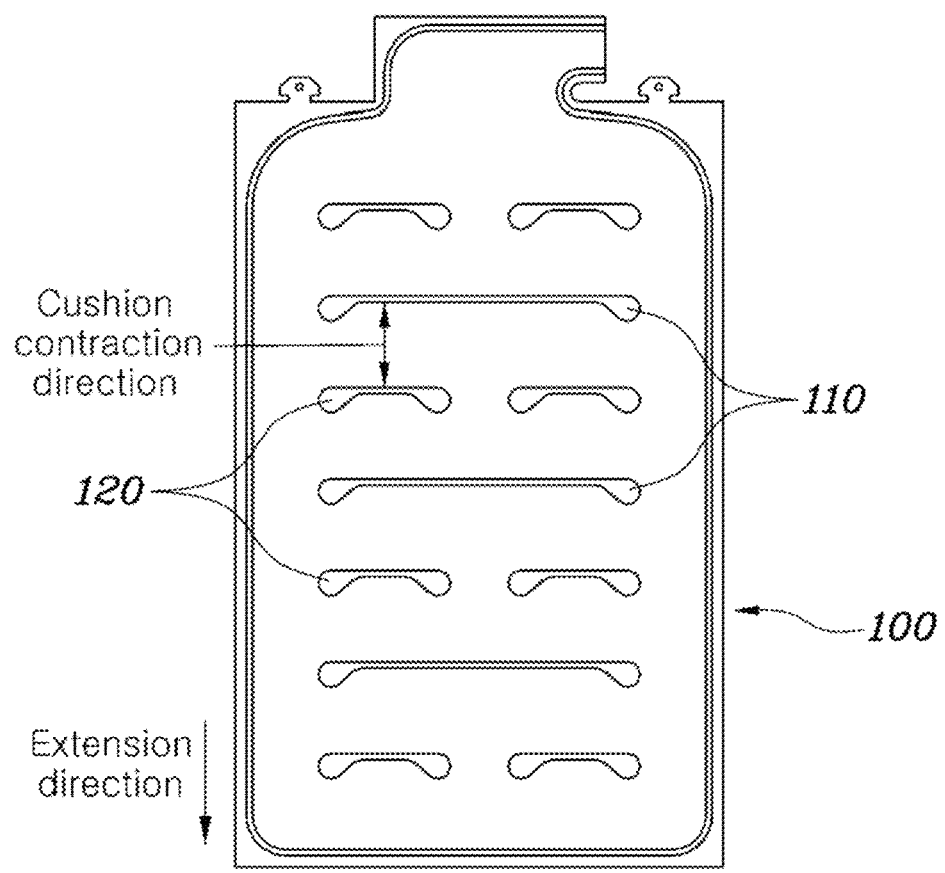
FIG. 2 is a plan view showing an airbag cushion in a state of not injecting gas of the roof airbag for a vehicle according to the embodiment of the present invention.
Figure 3:
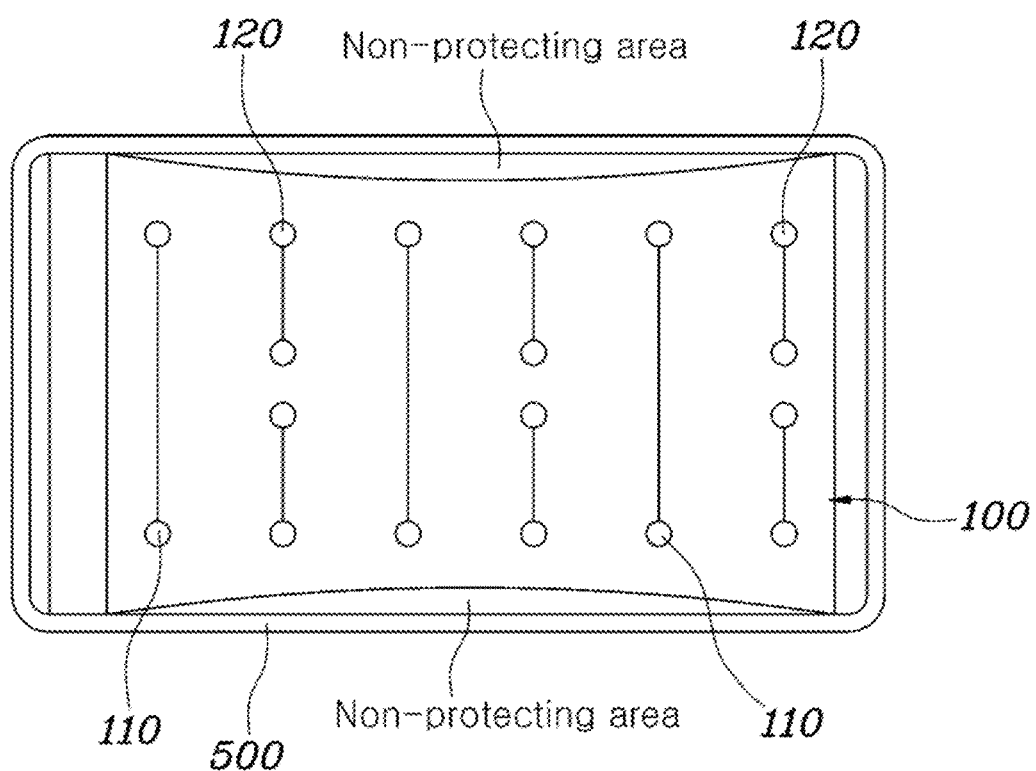
FIG. 3 is a plan view showing the roof airbag for a vehicle according to the embodiment of the present invention.
Figure 4:
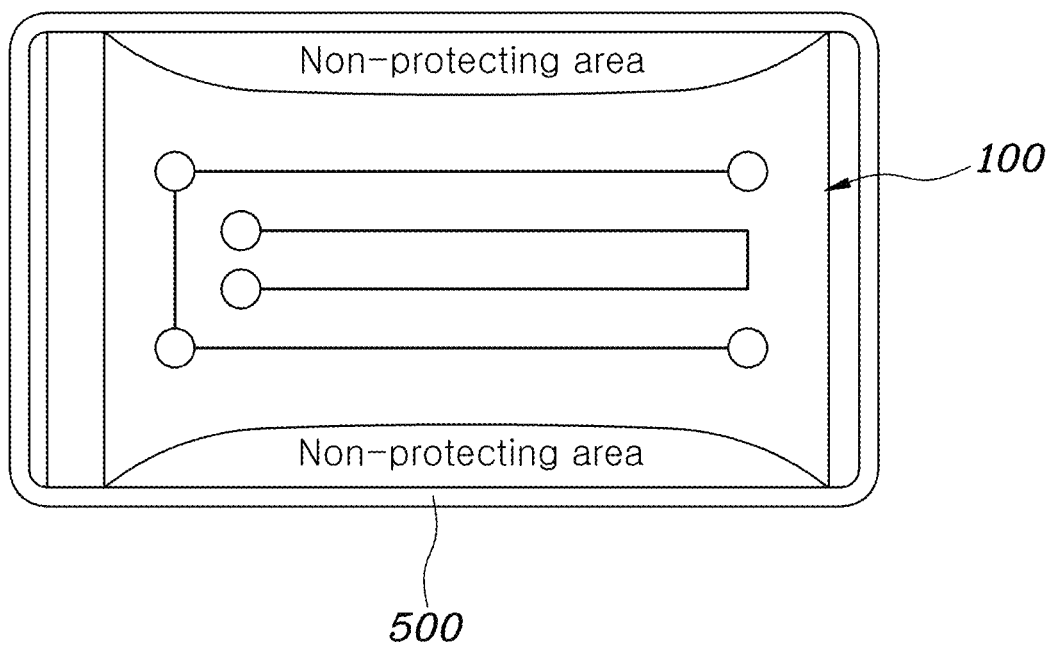
FIG. 4 is a plan view showing a conventional roof airbag for a vehicle.

FIG. 1 is an exploded front view showing a roof airbag for a vehicle according to an embodiment of the present invention. FIG. 2 is a plan view showing an airbag cushion in a state of not injecting gas of the roof airbag for a vehicle according to the embodiment of the present invention. FIG. 3 is a plan view showing the roof airbag for a vehicle according to the embodiment of the present invention. FIG. 4 is a plan view showing a conventional roof airbag for a vehicle.

Hereinbelow, a roof airbag for a vehicle according to an exemplary embodiment of the present invention will be described with reference to FIGS. 1 to 4.

As shown in FIG. 4, the conventional airbag for a vehicle has a seam portion joining upper and lower surfaces of an airbag cushion 100 in order to guide gas injected into the airbag cushion 100, so the airbag cushion 100 is contracted in a direction intersected with an unfolded direction of the airbag cushion 100.

As a result, non-protecting areas in which the passenger is not protected by the airbag cushion 100 are generated at opposite ends of the unfolded airbag cushion 100, and passengers may be injured due to the non-protecting areas.

The roof airbag for a vehicle according to the embodiment of the present invention is designed for minimizing the non-protecting areas by the conventional roof airbag for a vehicle so as to reduce injuries to the passengers.

Specifically, the roof airbag for a vehicle according to the present invention includes: the airbag cushion 100 located at a roof panel 500 of the vehicle and unfolded from a first side portion to a second side portion of the roof panel 500 during an operation thereof; a first seam portion 110 extended in a direction intersected with an unfolded direction of the airbag cushion 100 and allowing upper and lower surfaces of the airbag cushion 100 to be in contact with each other; and an inflator 200 coupled to the first side portion of the roof panel 500, connected to the airbag cushion 100, and configured to inject gas into the airbag cushion 100 so as to allow the airbag cushion 100 to be unfolded from the first side portion to the second side portion of the roof panel 500.

As shown in FIGS. 1 to 3, the airbag cushion 100 is located at the roof panel 500 of the vehicle and may be unfolded from the first side portion to the second side portion of the roof panel 500.

According to the embodiment of the present invention, the airbag cushion 100 of the roof airbag for a vehicle is mounted in the front of the roof panel 500, and is designed to be unfolded rearward. However, the airbag cushion 100 may be unfolded forward from a rear side portion to a front side portion of the roof panel 500.

The airbag cushion 100 may prevent a passenger from being ejected outward from the vehicle room through a sunroof when the vehicle rolls over, or may protect the passenger from being injured due to contact with the roof panel 500.

The inflator 200 is located at the roof panel 500 and is connected to the airbag cushion 100, so the inflator 200 injects gas into the airbag cushion 100 and may unfold the airbag cushion 100 in an accident of the vehicle.

The first seam portion 110 is extended in the direction intersected with the unfolded direction of the airbag cushion 100 and joins the upper and lower surfaces of the airbag cushion 100 together. Accordingly, when the airbag cushion 100 is injected with the gas and expanded, the first seam portion 110 may be contracted in a direction parallel to the unfolded direction of the airbag cushion 100.

A plurality of first seam portions 110 may be provided and arranged to be spaced apart from each other in the unfolded direction of the airbag cushion. The airbag cushion 100 may be uniformly contracted as the first seam portions are arranged to be spaced apart from each other at constant intervals.

Accordingly, it is possible to minimize the non-protecting areas in which the passenger is not protected by the conventional roof airbag for a vehicle, and thus the probability of the passenger being injured may be reduced.

When the airbag cushion 100 is unfolded, the airbag cushion 100 may be contracted in a direction parallel to the unfolded direction thereof.

As shown in FIGS. 2 and 3, when the airbag cushion 100 is unfolded, the airbag cushion 100 may be contracted in the direction parallel to the unfolded direction of the airbag cushion 100 through the plurality of first seam portions 110 formed in the direction intersected with the unfolded direction of the airbag cushion 100.

Accordingly, in the conventional roof airbag for a vehicle, the non-protecting areas at the opposite ends of the unfolded airbag cushion 100 may be minimized, and thus the probability of the passenger being injured may be reduced.

The first seam portions 110 may be formed by being spaced apart from a lateral end of the unfolded airbag cushion 100 toward a central portion of the airbag cushion 100.

The first seam portions 110 are spaced apart from the lateral end of the unfolded airbag cushion 100 toward the central portion of the airbag cushion 100. Accordingly, when the gas is injected into the airbag cushion 100, the first seam portions 110 may guide the gas to be injected into an outer portion of the airbag cushion 100 firstly and then to be injected into an inner portion.

Therefore, the airbag cushion 100 may be unfolded quickly from the first side portion to the second side portion of the roof panel 500.

The roof airbag includes: a second seam portion 120 separated apart from the first seam portion 110 in the unfolded direction of the airbag cushion 100, allowing the upper and lower surfaces of the airbag cushion 100 to be in contact with each other, and extended in the direction intersected with the unfolded direction of the airbag cushion 100 with a length relatively shorter than a length of the first seam portion 110.

The second seam portion 120 is spaced apart from the first seam portion 110 in the unfolded direction of the airbag cushion 100 and allows the upper and lower surfaces of the airbag cushion 100 to be in contact with each other. The second seam portion 120 may be extended in the direction intersected with the unfolded direction of the airbag cushion 100. The second seam portion 120 may have a length relatively shorter than the length of the first seam portion 110.

Therefore, the second seam portion 120 has an effect of assisting the first seam portion 110 to contract the airbag cushion 100 in the unfolded direction during the unfolding of the airbag cushion 100.

A plurality of second seam portions 120 may be formed by being spaced apart from each other in an extended longitudinal direction thereof.

As shown in FIGS. 2 and 3, the plurality of second seam portions 120 are spaced apart from each other in the extended longitudinal direction. The second seam portions 120 may guide a flow direction of the gas injected into the airbag cushion 100, so that the gas is filled in the outer portion of the airbag cushion 100 firstly and then is filled in a direction toward the center of the airbag cushion 100.

When the outer portion of the airbag cushion 100 is filled with the gas firstly and then the central portion thereof is filled, the airbag cushion 100 may be unfolded quickly from the first side portion to the second side portion of the roof panel 500.

The second seam portions 120 may be formed by being spaced apart from the lateral end of the unfolded airbag cushion 100 toward the central portion of the airbag cushion 100.

As shown in FIGS. 2 and 3, the plurality of second seam portions 120 is spaced apart from each other in the extended direction, opposite ends of the second seam portion 120 are spaced apart from the lateral end of the unfolded airbag cushion 100 toward the central portion of the airbag cushion 100. Accordingly, the second seam portion 120 may guide a flow direction of the gas injected into the airbag cushion 100, so that the gas may be injected into the outer portion of the airbag cushion 100 firstly.

Therefore, as the gas is filled into the outer portion of the airbag cushion 100 firstly and then is filled into the center of the airbag cushion 100, the airbag cushion 100 may be unfolded quickly from the first side portion to the second side portion of the roof panel 500.

The inflator 200 may be connected to a first bracket 220 and a clamp 210 to be connected to the roof panel 500.

As shown in FIG. 1, the inflator 200 is fixed to the first bracket 220 by the clamp 210 and the first bracket 220 is coupled to the roof panel 500 thereby locating the inflator 200 at the roof panel 500.

Therefore, the inflator 200 may be connected to the airbag cushion 100 located at the roof panel 500 by the shortest distance.

The roof airbag includes a second bracket 300 coupled to the first side portion of the roof panel 500 of the vehicle and coupled to the airbag cushion 100.

The airbag cushion 100 is coupled to the second bracket 300 so as to be located at the roof panel 500 of the vehicle. The second bracket 300 is coupled to the first side portion of the roof panel 500 thereby locating the airbag cushion 100, so that the airbag cushion 100 is unfolded from the first side portion to the second side portion of the roof panel 500.

The roof airbag includes a guide device 400. The guide device 400 is coupled to the roof panel 500 of the vehicle, connected to the lateral end of the unfolded airbag cushion 100, extended in the unfolded direction of the airbag cushion 100 to guide the unfolding of the airbag cushion 100 from the first side portion to the second side portion of the roof panel 500.

As shown in FIG. 1, the guide device 400 connects the opposite ends of the unfolded airbag cushion 100 to the roof panel 500. Therefore, the airbag cushion 100 may be located in a plane parallel to an extended plane of the roof panel 500. In a case of a vehicle with a sunroof, the guide device 400 may guide the airbag cushion 100 to be unfolded to a location corresponding to the sunroof when the airbag cushion 100 is unfolded.

The guide device 400 may include: a wire 410 mounted to the roof panel 500 of the vehicle and extended in the unfolded direction of the airbag cushion 100; and a connecting portion 420 connecting the airbag cushion 100 to the wire 410.

As shown in FIG. 1, the guide device 400 includes: the wire 410 connected to the roof panel 500 and extended in the longitudinal direction of the airbag cushion; and the connecting portion 420 connecting the wire 410 to the airbag cushion 100. The connecting portion 420 may be moved along the wire 410 in an extended direction of the wire 410, and the connecting portion 420 may guide the unfolding of the airbag cushion 100 in the extended direction of the wire 410 when the airbag cushion 100 is unfolded.

Accordingly, the airbag cushion 100 may be unfolded quickly along the wire 410 to a precise location thereof.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A roof airbag for a vehicle, the roof airbag comprising:
    an airbag cushion located at a roof panel of the vehicle and configured to be unfolded from a first side portion to a second side portion of the roof panel during an operation of the airbag cushion;
    a plurality of first seam portions extended in one direction that is intersected with an unfolded direction of the airbag cushion and joining upper and lower surfaces of the airbag cushion to each other;
    a plurality of second seam portions separated from the plurality of first seam portions in the unfolded direction of the airbag cushion, and allowing the upper and lower surfaces of the airbag cushion to be in contact with each other, and being extended in the direction intersected with the unfolded direction of the airbag cushion with lengths relatively shorter than lengths of the plurality of first seam portions; and
    an inflator coupled to the first side portion of the roof panel, and connected to the airbag cushion, and configured to inject gas into the airbag cushion so as to allow the airbag cushion to be unfolded from the first side portion to the second side portion of the roof panel,
    wherein each of the plurality of first seam portions has a first end and a second end, the first end and the second end being connected by a straight line,
    wherein each of the plurality of second seam portions has a first end and a second end, the first end and the second end being connected by a straight line,
    wherein the plurality of first seam portions are arranged in parallel with the plurality of second seam portions in the unfolded direction, with the plurality of second seam portions arranged between the plurality of first seam portions.

2. The roof airbag of claim 1, wherein the plurality of first seam portions are formed by being spaced apart from a lateral end of the unfolded airbag cushion toward a central portion of the airbag cushion.

3. The roof airbag of claim 1, wherein the plurality of second seam portions are arranged to be spaced apart from each other in an extended longitudinal direction thereof.

4. The roof airbag of claim 1, wherein the plurality of second seam portions are formed by being spaced apart from a lateral end of the unfolded airbag cushion toward a central portion of the airbag cushion.

5. The roof airbag of claim 1, wherein the inflator is coupled to the roof panel by being connected to both a first bracket and a clamp.

6. The roof airbag of claim 1, further comprising:
    a second bracket coupled to the first side portion of the roof panel of the vehicle and coupled to the airbag cushion.

7. The roof airbag of claim 1, further comprising:
    a guide device coupled to the roof panel of the vehicle, and connected to a lateral end of the unfolded airbag cushion, and extended in the unfolded direction of the airbag cushion to guide an unfolding of the airbag cushion from the first side portion to the second side portion of the roof panel.

8. The roof airbag of claim 7, wherein the guide device comprises: a wire mounted to the roof panel of the vehicle and extended in the unfolded direction of the airbag cushion; and a connecting portion connecting the airbag cushion to the wire.

9. The roof airbag of claim 1, wherein the plurality of first seam portions and the plurality of second seam portions are arranged such that the airbag cushion contracts in the direction parallel to the unfolded direction of the airbag cushion during an unfolding thereof thereby minimizing a non-protecting area associated with the airbag cushion.

* * * * *